United States Patent [19]

Kobayashi et al.

[11] Patent Number: 4,827,350
[45] Date of Patent: May 2, 1989

[54] IMAGE READING APPARATUS HAVING A PLURALITY OF IMAGE SENSORS

[75] Inventors: Shinji Kobayashi; Tomio Sasaki, both of Tokyo, Japan

[73] Assignee: Ricoh Company, Ltd., Tokyo, Japan

[21] Appl. No.: 199,704

[22] Filed: May 27, 1988

[30] Foreign Application Priority Data

May 30, 1987 [JP] Japan .............................. 62-133414
Jun. 13, 1987 [JP] Japan .............................. 62-146205

[51] Int. Cl.$^4$ .......................... H04N 1/12; H04N 1/40
[52] U.S. Cl. .................................. 358/280; 358/293; 358/294
[58] Field of Search ..................... 358/294, 293, 280

[56] References Cited

U.S. PATENT DOCUMENTS

| 4,318,135 | 3/1982 | Allis | 358/294 |
| 4,686,581 | 8/1987 | Spehrley | 358/294 |
| 4,691,237 | 9/1987 | Shimizu | 358/280 |

OTHER PUBLICATIONS

Manual of RICORE 3000 (sold as of May 16, 1983).

Primary Examiner—Howard W. Britton
Attorney, Agent, or Firm—Oblon, Fisher, Spivak, McClelland & Maier

[57] ABSTRACT

An image reading apparatus comprises a plurality of image sensors, and one line data of image information read by the image sensors is obtained by connecting output signals of two mutually adjacent image sensors at a position corresponding to one-half an overlap quantity of image information outputted from the two mutually adjacent image sensors.

13 Claims, 14 Drawing Sheets

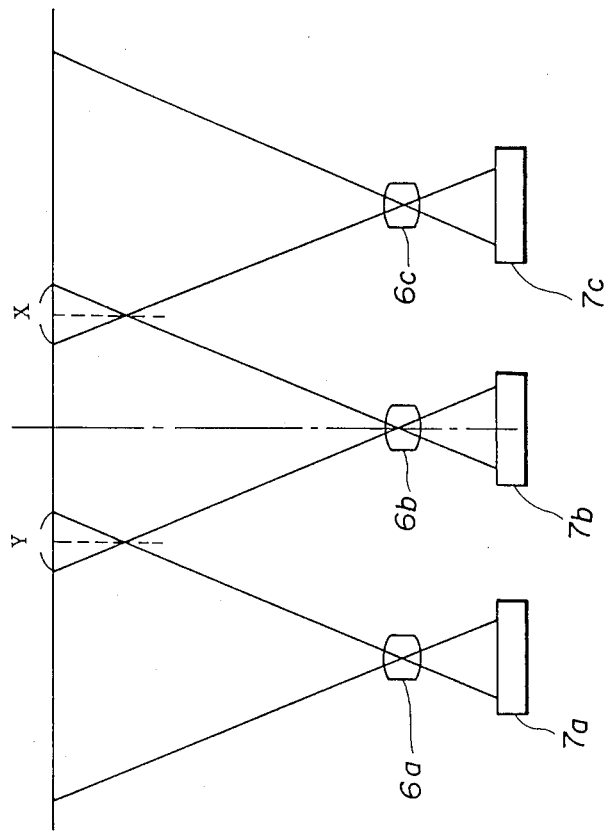

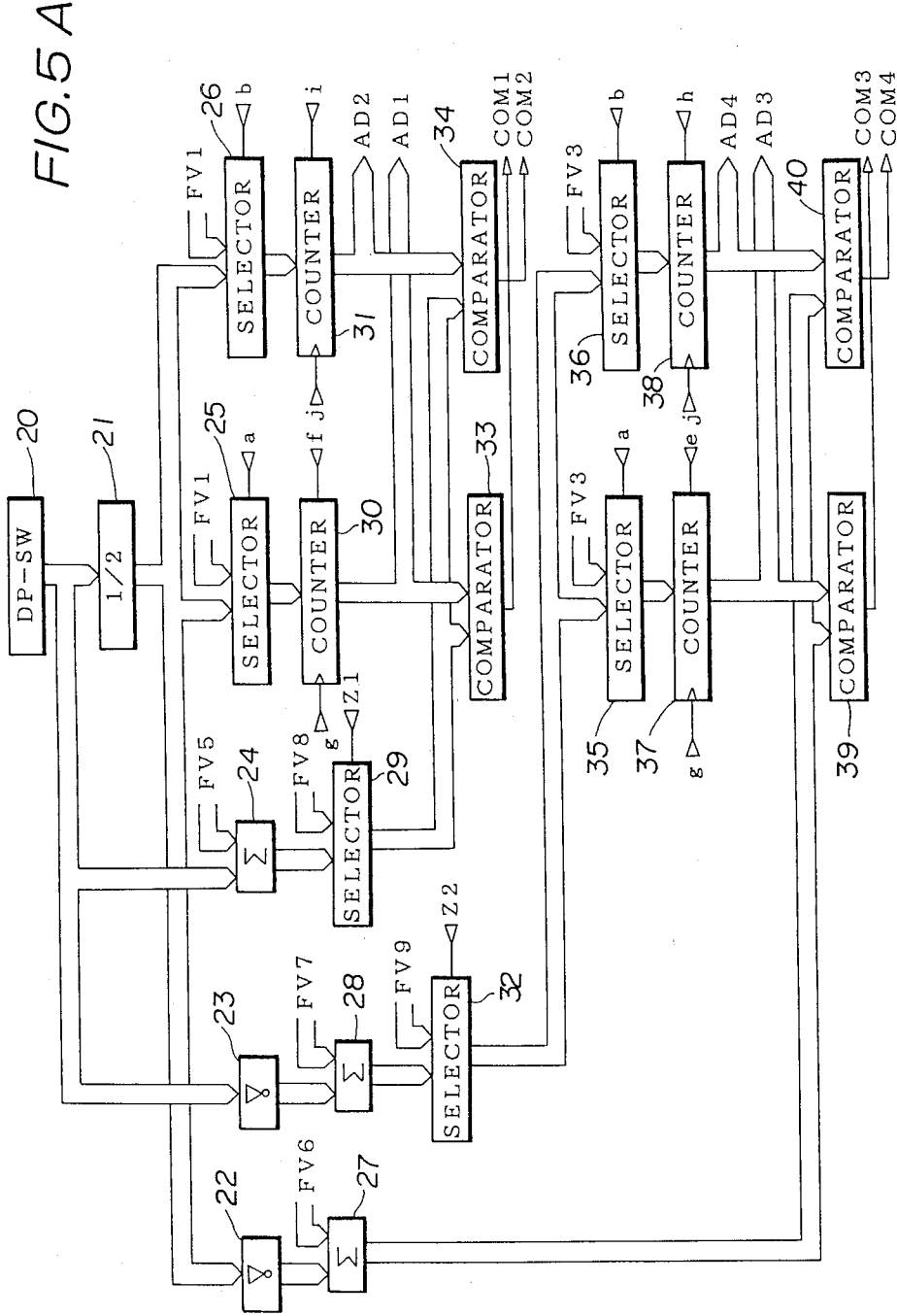

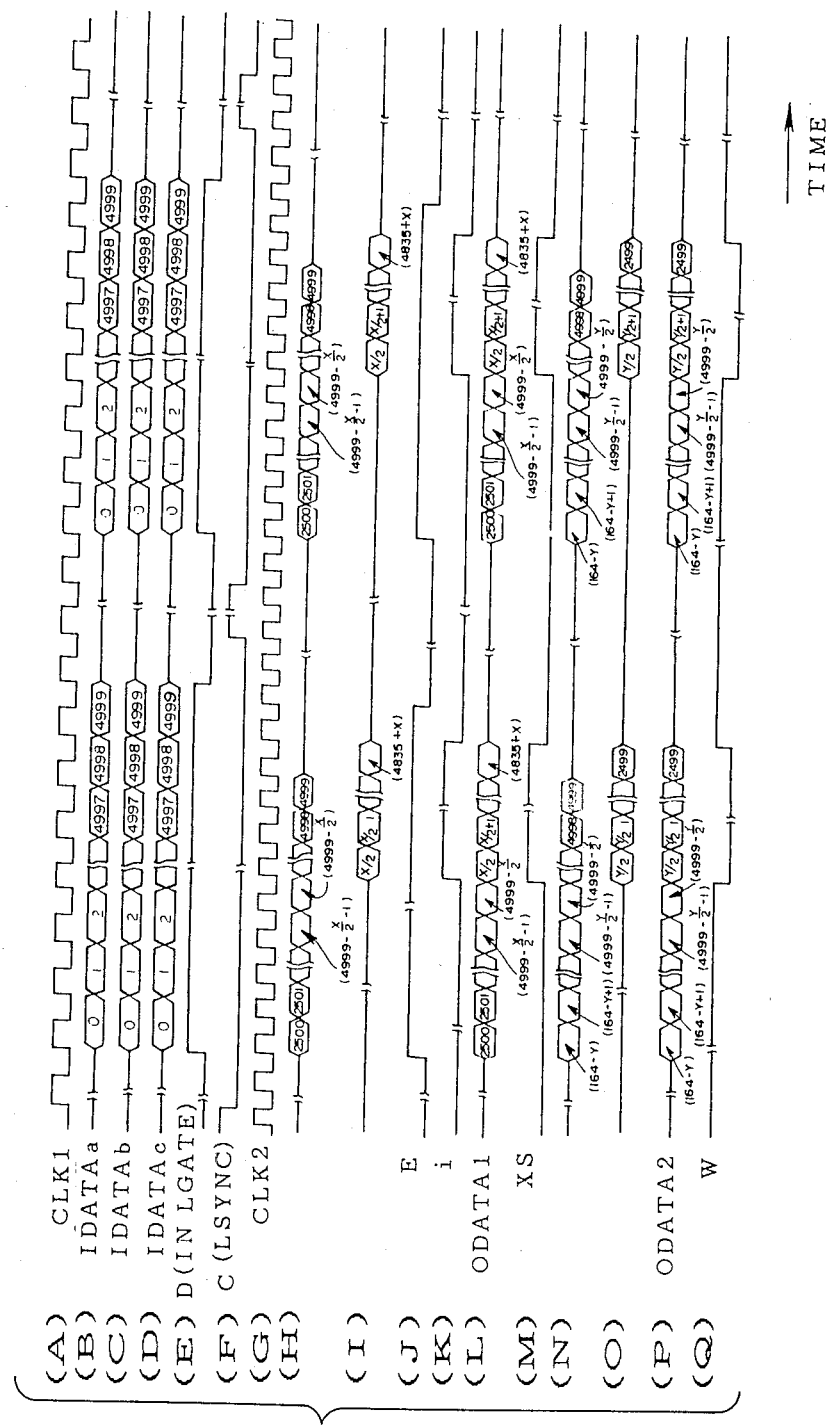

INPUT IMAGE DATA

CENTER  DOCU-MENT

OUTPUT IMAGE DATA

CENTER  Pa

INPUT IMAGE DATA

CENTER

OUTPUT IMAGE DATA

Pb  CENTER

INPUT IMAGE DATA

CENTER

DOCU-MENT

OUTPUT IMAGE DATA

CENTER

IMAGE READING APPARATUS HAVING A PLURALITY OF IMAGE SENSORS

BACKGROUND OF THE INVENTION

The present invention generally relates to image reading apparatuses, and more particularly to an image reading apparatus using a plurality of photoelectric conversion elements or image sensors.

A digital copying machine, a facsimile machine, an information filing system and an input device for computer aided design (CAD) are examples of the kind of image reading apparatus which uses a plurality of image sensors and reads an image by projecting the image on the image sensors.

Conventionally, in this kind of image reading apparatus, one line data is put together from outputs of the image sensors as follows. That is, there is an overlap of image information between the projections on two mutually adjacent image sensors. Hence, when connecting the output signals of the two mutually adjacent image sensors so as to obtain one line data, a connecting position of the output signal of a first of the two mutually adjacent image sensors is fixed while a connecting position of the output signal of a second of the two mutually adjacent image sensors is variably adjusted depending on the overlap quantity. This adjustment is made by an adjusting means such as a dip switch.

However, when imaging the image of a document surface onto the image sensors by use of lenses, the resolution deteriorates and the quantity of incident light to the image sensors decreases at the edge portion of the lens. For this reason, when the connecting position of the output signal of the first of the two mutually adjacent image sensors is fixed, the connecting position of the output signal of the second of the two mutually adjacent image sensors may be located at a position where the resolution is poor or the quantity of incident light is reduced depending on the overlap quantity.

In addition, when the resolution and the quantity of incident light are unbalanced between the two mutually adjacent image sensors, the read image may look unnatural at the connecting position in the one line data where the output signals of the two mutually adjacent image sensors connect.

On the other hand, in the conventional image reading apparatus using the image sensors, the read-out sequence of the picture element data is changed by taking into account the overlap quantity between the two mutually adjacent image sensors in order to obtain the output image information from the image sensors. No consideration is given as to the effective number of picture elements. In addition, the image information corresponding to the right and left ends of the image becomes indefinite, and a white line or a black line may appear at the right and left ends of a printed image when the read image information is supplied to a printer.

SUMMARY OF THE INVENTION

Accordingly, it is a general object of the present invention to provide a novel and useful image reading apparatus in which the problems described heretofore are eliminated.

Another and more specific object of the present invention is to provide an image reading apparatus comprising a plurality of image sensors, in which one line data of image information read by the image sensors is obtained by connecting output signals of two mutually adjacent image sensors at a position corresponding to one-half an overlap quantity of image information outputted from the two mutually adjacent image sensors. According to the image reading apparatus of the present invention, it is possible to obtain an image in which each portion corresponding to a connecting position of the output signals of the two mutually adjacent image sensors appears natural.

Still another object of the present invention is to provide an image reading apparatus in which, based on a maximum number of effective picture elements, each overlap quantity of image information outputted from two mutually adjacent image sensors is put together into one line data as an offset value. According to the image reading apparatus of the present invention, it is possible to facilitate the entering of the overlap quantity, thereby improving the operating characteristics of the image reading apparatus.

A further object of the present invention is to provide an image reading apparatus for optically reading an image of a document and comprising an illumination device for illuminating the document, a plurality of optical lenses, a plurality of image sensors on which the image of the document illuminated by the illumination device is imaged through the optical lenses, where the image sensors output analog image signals describing the image of the document and the analog image signals include overlapping image information which overlap by an overlap quantity between two mutually adjacent image sensors out of the image sensors, converting means for converting the analog image signals from the image sensors into digital image signals describing picture elements constituting the image, and circuit means supplied with the digital image signals from the converting means for connecting the digital image signals to form each line data of the image. The circuit means comprises memory means for storing the digital image signals from the converting means and the overlap quantity and control means for controlling write and read operations of the memory means, and the control means controls the read operation of the memory means so that in each line data digital image signals derived from the output analog image signals of the two mutually adjacent image sensors connect at a position corresponding to one-half the overlap quantity.

Another object of the present invention is to provide an image reading apparatus in which the document is inserted into the image reading apparatus in a document inserting direction by taking a center position of the document along a direction perpendicular to the document inserting direction as a reference position which coincides with a center of the image sensors which are arranged in the direction perpendicular to the document inserting direction, and the circuit means processes each one line data of the digital image signals in two divisions about a center of the one line data constituted by image data by processing one-half of the image data in a main scanning direction from the center of the one line data and processing a remaining one-half of the image data in a direction opposite to the main scanning direction from the center of the one line data, the main scanning direction being a direction in which the image sensors scan the image of the document.

Other objects and further features of the present invention will be apparent from the following detailed description when read in conjunction with the accompanying drawings.

BRIEF DESCRIPTION OF THE DRAWINGS

FIG. 3 shows the positional relationship of the optical lenses and the CCDs of the image reading apparatus on an enlarged scale;

FIGS. 5A through 5C are system block diagrams respectively showing an embodiment of a circuit part of the block system shown in FIG. 4;

FIG. 6A and FIG. 6B are timing charts for explaining the operation of the circuit part shown in FIGS. 5A through 5C;

DETAILED DESCRIPTION

Figure 1:
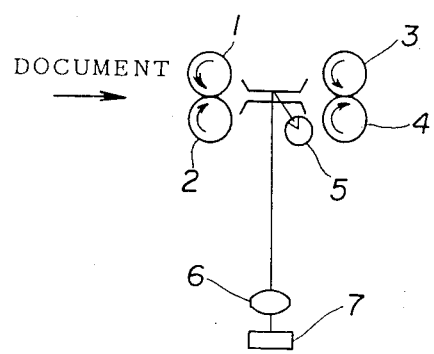
FIG. 1 generally shows an essential part of a first embodiment of the image reading apparatus according to the present invention.

FIG. 1 generally shows an essential part of a first embodiment of the image reading apparatus according to the present invention. The image reading apparatus comprises transport rollers 1 through 4, an illumination device 5, optical lenses 6, and charge coupled devices (CCDs) 7 constituting image sensors. A document (not shown) is supplied in a direction of an arrow and is transported by the transport rollers 1 through 4. While the document is transported by the transport rollers 1 through 4, the document is illuminated by the illumination device 5 and an image of the document is imaged on the CCDs 7 by the optical lenses 6.

An effective number of picture elements (hereinafter referred to as an effective picture element number) read per CCD 7 is fixed, and a document width which can be read by the CCD 7 is determined when a document reading density is determined. The effective picture element number is a product of the maximum document width which can be read by the CCD and the picture element density. But when the document width exceeds the width which can be read by a single CCD, a plurality of CCDs must be used. In the present embodiment, three CCDs 7 are used.

In the present embodiment, it is assumed for convenience' sake that the effective picture element number per CCD 7 is 5000 picture elements, a maximum document width which can be read by the CCD 7 is 917 mm, and the document reading density is 16 picture elements/mm. From the maximum document width of 917 mm and the document reading density of 16 picture elements/mm, it is found that a maximum effective picture element number needs to be 14,672 picture elements. Since the effective picture element number per CCD 7 is 5000 picture elements, three CCDs 7 are used as described before.

Figure 2:
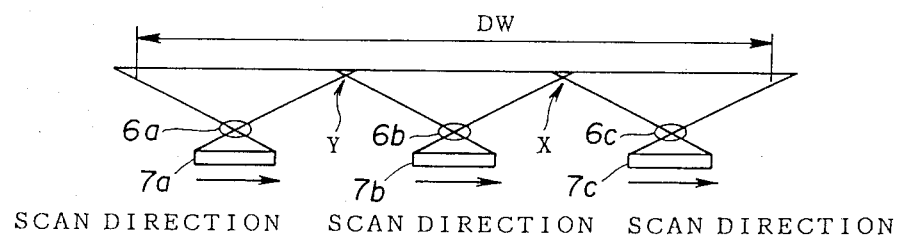
FIG. 2 shows the positional relationship of three optical lenses and three CCDs of the image reading apparatus.

FIGS. 2 and 3 show the positional relationship of three optical lenses 6a through 6c and three CCDs 7a through 7c used in the present embodiment of the image reading apparatus. In FIG. 2, DW denotes a maximum document width, and X and Y respectively denote an overlap quantity of the reading regions of the CCDs 7b and 7c and an overlap quantity of the reading regions of the CCDs 7a and 7b. FIG. 3 shows the positional relationship of FIG. 2 on an enlarged scale.

As shown in FIG. 2, the three CCDs 7a through 7c are used so as to read the maximum document width DW. The image of the document is imaged on the CCDs 7a through 7c through the respective optical lenses 6a through 6c, and the reading regions of the CCDs 7b and 7c and the reading regions of the CCDs 7a and 7b overlap as indicated by X and Y. The overlap quantities X and Y are each set within 164 ($=(15,000-14,672)/2$) picture elements so that the maximum document length DW can be read by the CCDs 7a through 7c.

The document image imaged on the CCDs 7a through 7c is obtained as analog image signals from the CCDs 7a through 7c. But since the analog image signals from the CCD 7a through 7c are extremely small signals, these analog image signals must be amplified.

Figure 4:
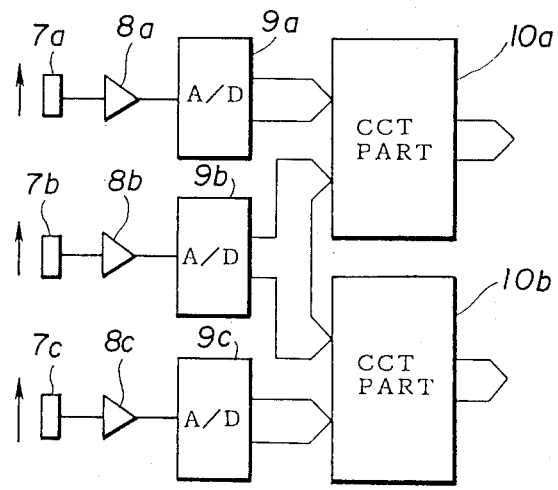
FIG. 4 is a system block diagram showing an essential part of the first embodiment of the image reading apparatus for processing output analog image signals of the CCDs.

FIG. 4 shows an essential part of the embodiment of the image reading apparatus for processing the output analog image signals of the CCDs 7a through 7c. A processing circuit comprises amplifiers 8a through 8c, analog-to-digital (A/D) converters 9a through 9c, and circuit parts 10a and 10b. The output analog image signals of the CCDs 7a through 7c are amplified in the corresponding amplifiers 8a through 8c and supplied to the corresponding A/D converters 9a through 9c. The A/D converters 9a through 9c convert the analog image signals into multiple state (for example, 64 gradation levels) digital image signals for each picture element. The output digital image signals of the A/D converters 9a through 9c include in addition to the regular image data noise caused by noise in the document image, inconsistency in the light quantity, dirt on a contact glass, inconsistency in the sensitivities of the CCDs 7a through 7c and the like. As a measure against the noise, the A/D converters 9a through 9c usually carry out a shading correction. Hence, the output analog image signals of the CCDs 7a through 7c are amplified, subjected to the shading correction and the analog-to-digital (A/D) conversion, and the resulting multiple state data are supplied to the circuit parts 10a and 10b.

Each of the CCDs 7a through 7c are simultaneously scanned and simultaneously output the picture element data. As may be seen from FIGS. 6B(A) through 6B(Q) which will be described later, the scans of the CCDs 7a through 7c in the main scanning direction are synchronized by a scan synchronizing signal C (LSYNC) shown in FIGS. 6A(C) and 6B(F), and the effective data from the CCDs 7a through 7c are controlled by an input control signal D (INLGATE) shown in FIGS. 6A(D) and 6B(E).

The inserting speed of the document in the sub scanning direction is determined by 16 pulses of the scan synchronizing signal LSYNC outputted per sub scan of 1 mm. Accordingly, the sub scanning density becomes 16 picture elements/mm and coincides with the main scanning density of 16 picture elements/mm. The pulses of the scan synchronizing signal LSYNC are generated at constant intervals so as to keep the charging times of the CCDs 7a through 7c constant.

The image data from the CCDs are usually subjected to an analog processing in parallel within the duration of the scan synchronizing signal LSYNC. But as described before, because of the need to compensate for the overlap quantity between two mutually adjacent CCDs and to carry out a digital processing in a digital processing part (for example, to carry out a variable power process, a modulation transfer function (MTF) process, a smoothing process and the like) after the analog processing also within the duration of the scan synchronizing signal LSYNC, the output data of the CCDs are usually put together into one line data, and the overlap quantity is compensated. However, when the output data of the three CCDs 7a through 7c are put together into the one line data within the duration of the scan synchronizing signal LSYNC, the processing speed of the image data per picture element becomes three times that of the case where only a single CCD is used.

On the other hand, according to the present embodiment, when 5000 picture element data are processed per CCD within the duration of 3125 $\mu$sec of the scan synchronizing signal LSYNC, the processing time per picture element becomes 625 nsec. But when the output data of the three CCDs 7a through 7c are put together into one line data within the duration of 3125 $\mu$sec, the processing time per picture element becomes 208 nsec which is approximately three times faster than the processing time of 625 nsec. According to the present embodiment, the output data of the three CCDs 7a through 7c are not simply put together into the one line data. The processing of the picture element data is divided into two parts on the right and left of a center value of the maximum document width DW corresponding to the 2449th picture element of the CCD 7b in FIG. 2, so as to process 7500 picture element data within the duration of the scan synchronizing signal LSYNC. As a result, the processing time is reduced to ½ compared to the case where the output data of the three CCDs 7a through 7c are simply put together into the one line data.

Usually, when compensating for the overlap quantity between two mutually adjacent CCDs and putting together the output data of the CCDs into the one line data by connecting the output data of the CCDs, a connecting position of the output data of a first of the two mutually adjacent CCDs is fixed while a connecting position of the output data of a second of the two mutually adjacent CCDs is variably adjusted depending on the overlap quantity so as to determine the effective data out of the output data of the CCDs.

However, according to the present embodiment, the effective data out of the output data of the CCDs is determined by ½ the overlap quantity X (or Y) in FIG. 3, that is, X/2 (or Y/2). By not fixing the connecting position of the output data of one of the two mutually adjacent CCDs, it is possible to prevent the undesirable effects of deteriorated resolution at the edge portions of the optical lenses 6a through 6c and also prevent the image data with the reduced light quantity from being made effective. As a result, it is possible to obtain an image in which each portion corresponding to a connecting position of the output signals of the two mutually adjacent CCDs appear natural.

The image data obtained from the three CCDs 7a through 7c within the duration of the scan synchronizing signal LSYNC are supplied in parallel from the A/D converters 9a through 9c to the circuit parts 10a and 10b. In addition, the effective data region of the image data is determined by the input control signal INLGATE.

Out of the image data IDATAb and IDATAc shown in FIGS. 6B(C) and 6B(D) obtained from the CCDs 7b and 7c, an effective data quantity of 5000 picture element data are successively supplied to the circuit part 10b from picture element numbers "0" to "4999". An output data ODATA1 shown in FIG. 6B(L) outputted from the circuit part 10b is made up of the image data from the CCD 7b first outputted from the picture element numbers "2500" to "4999- X/2" and the image data from the CCD 7c then outputted from the picture element numbers "X/2" to "X+4835", where X denotes the overlap quantity. By outputting the image data from the CCDs 7b and 7c in this manner, it is possible to compensate for the overlap quantity X and put together the image data into one line data. Moreover, it is possible to output 7336 picture element data which is ½ the effective data quantity of 14,672 picture element data from a central portion of the document reading width. The control timing of the output data ODATA1 is shown in FIGS. 6B(J) (or 6A(F)) and 6B(M) (or 6A(X)) which respectively show signals E and XS.

Similarly, out of the image data IDATAa and IDATAb shown in FIGS. 6B(B) and 6B(C) obtained from the CCDs 7a and 7b, an effective data quantity of 5000 picture element data are supplied to the circuit part 10a from the picture element numbers "0" to "4999". An output data ODATA2 shown in FIG. 6B(P) outputted from the circuit part 10a is made up of the image data from the CCD 7a first outputted from the picture element numbers "164−Y" to "4999−Y/2" and the image data from the CCD 7b then outputted from the picture element numbers "Y/2" to "2499", where Y denotes the overlap quantity. By outputting the image data from the CCDs 7a and 7b in this manner, it is possible to compensate for the overlap quantity Y and put together the image data into one line data. Moreover, it is possible to output 7336 picture element data which is ½ the effective data quantity of 14,672 picture element data from the central portion of the document reading width. The control timing of the output data ODATA2 is shown in FIGS. 6B(J) (or 6A(F)), 6B(M) (or 6A(X)) and 6B(Q) (or 6A(Y)) which respectively show signals E, XS and W.

The output data of the circuit part 10b is obtained in the main scanning direction and the image data is outputted at a speed which is 3/2 times that of the input data. Similarly, the output data of the circuit part 10a is obtained in the main scanning direction and the image data is outputted at a speed which is 3/2 times that of the input data.

With regard to the CCD 7b located at the center between the CCDs 7a and 7c, the effective picture element data are 5000 at the maximum. On the other hand, the effective picture element data from the CCDs 7a and 7c on both sides of the CCD 7b are 4836 at the maximum, respectively. The overlap quantities X and Y are within 164 picture elements as described before.

Figure 5B:
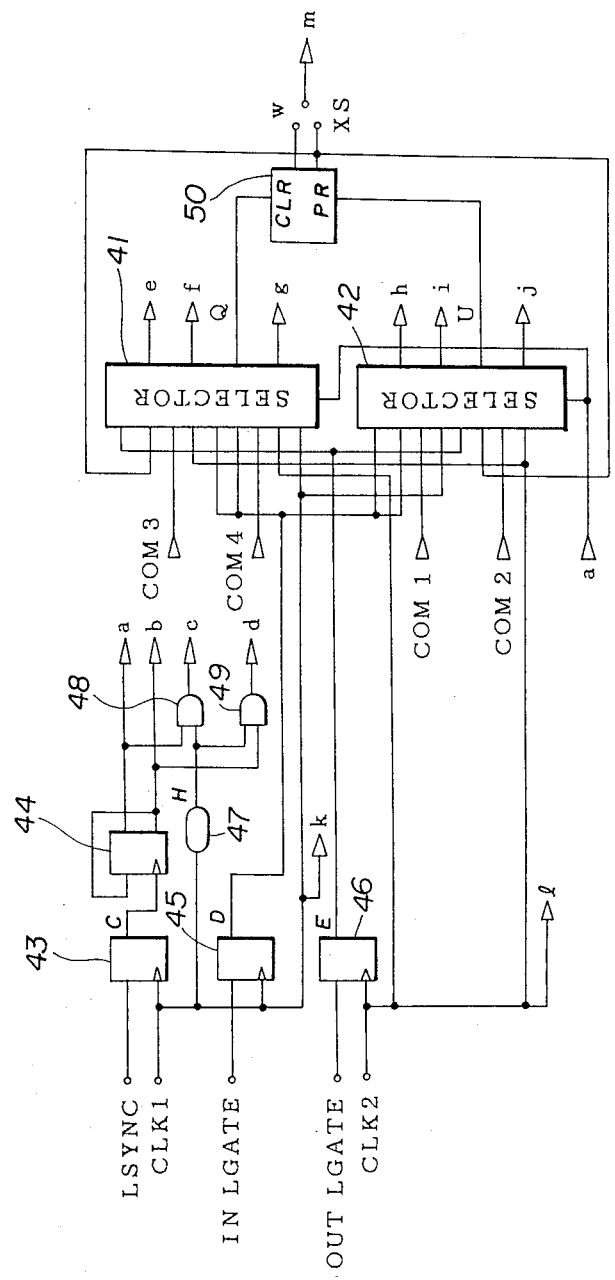
Figure 5C:
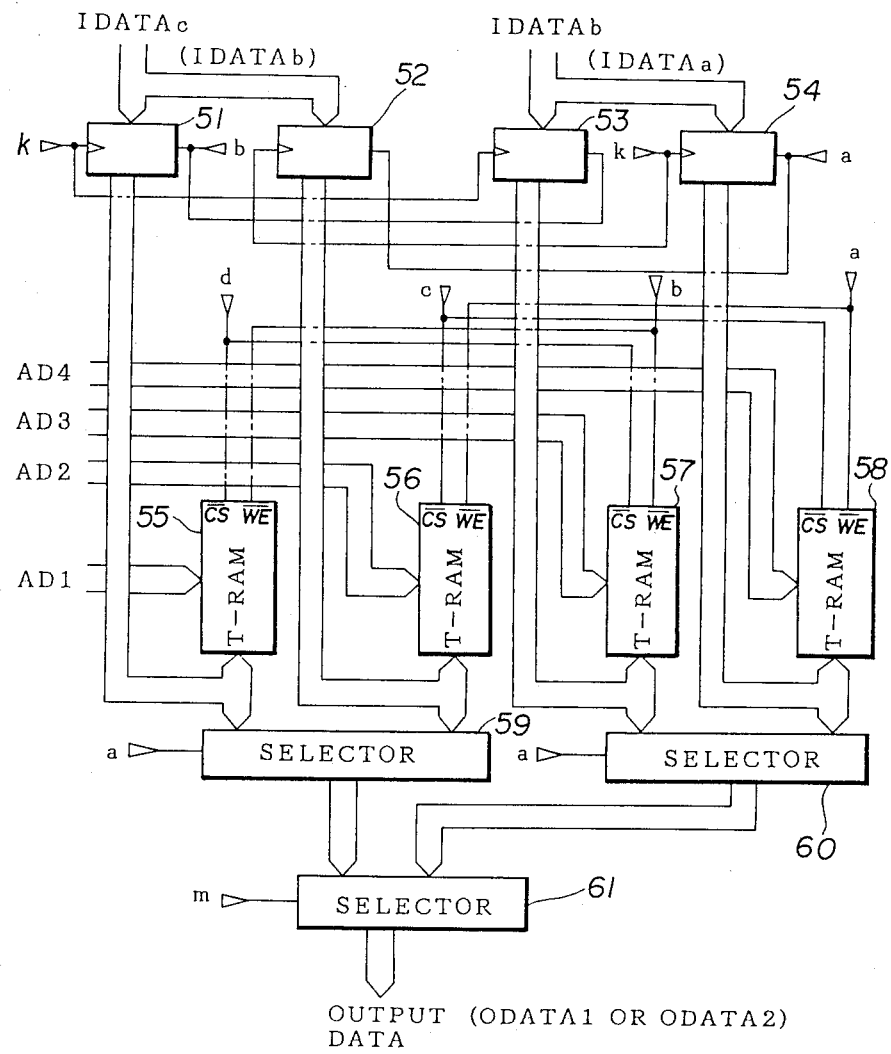

FIGS. 5A through 5C show an embodiment of the circuit parts 10a and 10b shown in FIG. 4 applicable to the first embodiment. The circuit part shown in FIGS. 5A through 5C comprises a dip switch 20, a ½ frequency divider 21, inverters 22 and 23, adders 24, 27 and 28, data selectors 25, 26, 29, 32, 35, 36, 41, 42, 59, 60 and 61, address counters 30, 31, 37 and 38, comparators 33, 34, 39 and 40, flip-flops 43, 44, 45, 46 and 50, AND gates 48 and 49, a delay element 47, toggle random access memories (T-RAMs) 55, 56, 57 and 58, and 3-state buffers 51, 52, 53 and 54 having a data latch function.

Next, a description will be given on the circuit part shown in FIGS. 5A through 5C by referring to FIGS. 6A(A) through 6A(Y) and FIGS. 6B(A) through 6B(Q).

Figure 6A:
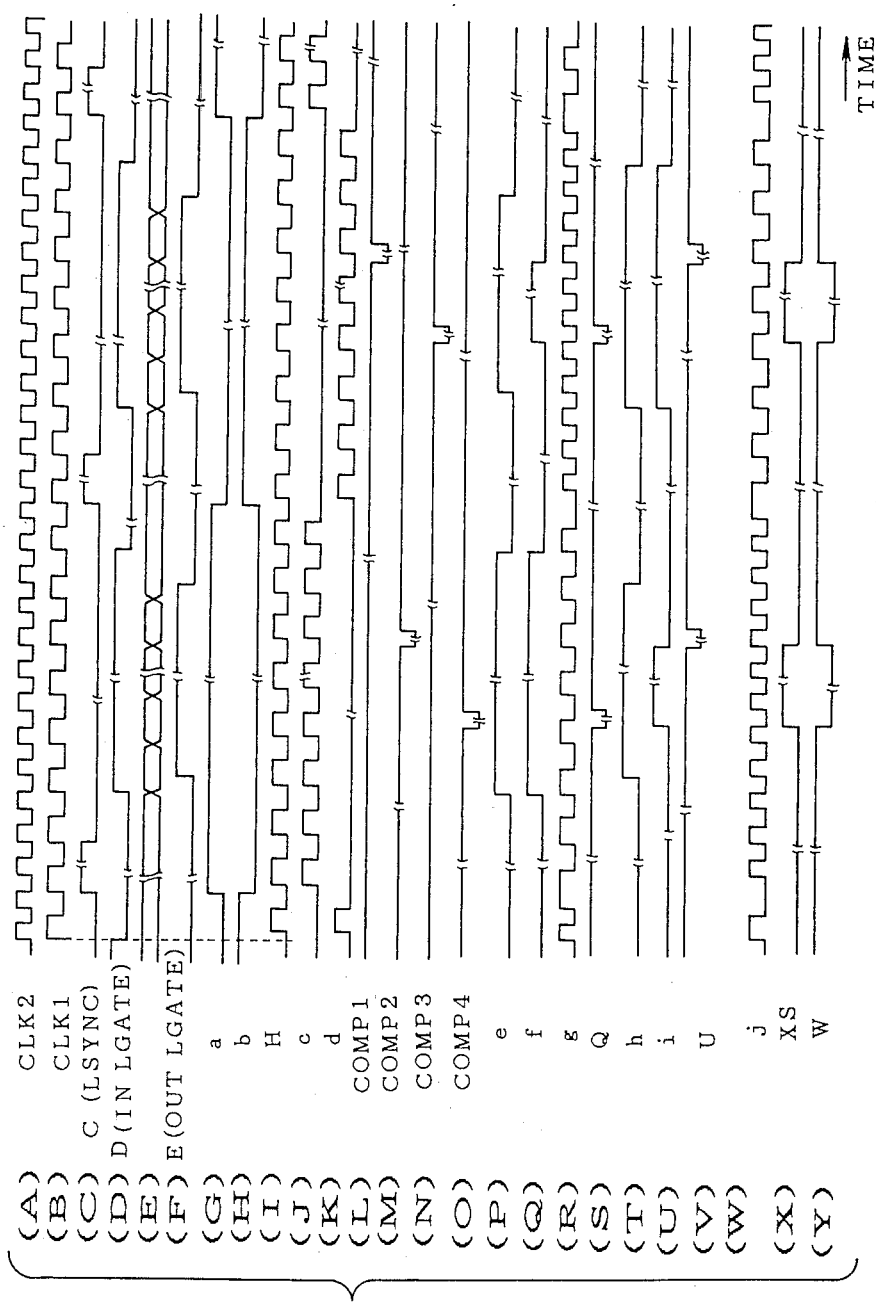

In the case where the circuit shown in FIGS. 5A through 5C is used as the circuit part 10b, the input data IDATAb sown in FIG. 6B(C) from the CCD 7b is latched by the 3-state buffers 53 and 54 shown in FIG. 5C while the input data IDATAc shown in FIG. 6B(D) from the CCD 7c is latched by the 3-state buffers 51 and 52. The output data of the 3-state buffer 51 is written into the T-RAM 55 or the output data of the 3-state buffer 52 is written into the T-RAM 56. The output data of the 3-state buffer 53 is written into the T-RAM 57 or the output data of the 3-state buffer 54 is written into the T-RAM 58. A signal a is supplied to the 3-state buffers 52 and 54 as a selection signal, and a signal b is supplied to the 3-state buffers 51 and 53 as a selection signal. The signals a and b are Q-output and $\bar{Q}$-output of the flip-flop 44 shown in FIG. 5B and are shown in FIGS. 6A(G) and 6A(H), respectively. The 3-state buffers 51 through 54 output the input data thereto when supplied with a low-level selection signal.

The write-in and read-out to and from the T-RAMs 55 through 58 are controlled by signals applied to chip select terminals $\overline{CS}$ and write enable terminals $\overline{WE}$ thereof. A signal c shown in FIG. 6A(J) from the AND gate 48 shown in FIG. 5A is applied to the chip select terminals $\overline{CS}$ of the T-RAMs 56 and 58, while a signal d shown in FIG. 6A(K) from the AND gate 49 is applied to the chip select terminals $\overline{CS}$ of the T-RAMs 55 and 57, so as to control the write-in timing thereof. The signal b applied to the write enable terminals $\overline{WE}$ and the signal d applied to the chip select terminals $\overline{CS}$ of the T-RAMs 55 and 57 control the read-out timing thereof, and the signal a applied to the write enable terminals $\overline{WE}$ and the signal c applied to the chip select terminals $\overline{CS}$ of the T-RAMs 56 and 58 control the read-out timing thereof. A clock signal CLK1 shown in FIG. 6A(B) (or 6B(A)) is delayed in the delay element 47 and is supplied to the AND gates 48 and 49 which are also supplied with the toggle mode signals a and b from the flip-flop 44. The signal c is obtained by taking an AND of the signal a and a delayed clock signal H shown in FIG. 6A(I) from the delay element 47, and the signal d is obtained by taking an AND of the signal b and the delayed clock signal H.

The scan synchronizing signal LSYNC is latched by the flip-flop 43 responsive to the clock signal CLK1 shown in FIG. 6A(B), and the scan synchronizing signal C (LSYNC) shown in FIG. 6A(C) is supplied to a clock input terminal of the flip-flop 44. The flip-flop 44 sub-frequency-divides the scan synchronizing signal LSYNC by ½ and outputs the toggle mode signals a and b shown in FIGS. 6A(G) and 6A(H). The clock signal CLK1 is supplied to clock input terminals of the 3-state buffers 51 and 53, and the input data IDATAc and IDATAb thereto are latched responsive to the clock signal CLK1. The signal b from the flip-flop 44 is used as the selection signal and the 3-state buffers 51 and 53 output the data to the corresponding T-RAMs 55 and 57 during the low-level period of the selection signal. The clock signal CLK1 is supplied to clock input terminals of the 3-state buffers 52 and 54, and the input data IDATAc and IDATAb thereto are latched responsive to the clock signal CLK1. The signal a from the flip-flop 44 is used as the selection signal and the 3-state buffers 51 and 53 output the data to the corresponding T-RAMs 56 and 58 during the low-level period of the selection signal.

Address count terminals of the T-RAMs 55 through 58 are connected to outputs AD1 through AD4 of the address counters 30, 31, 37 and 38 shown in FIG. 5A. When one of the T-RAMs 55 and 56 (or one of the T-RAMs 57 and 58) carries out a write operation, the other carries out a read operation. In other words, the present input data is written into one of the T-RAMs 55 and 56 while the previous input data is read out from the other. The data selectors 59 and 60 selectively output the read out data from the T-RAMs 55 through 58. The selection made by the data selectors 59 and 60 is controlled by the signal a from the flip-flop 44.

The address counters 37 and 38 connected to the T-RAMs 57 and 58 which carry out the write-in and read-out of the data IDATAb from the CCD 7b are presettable up-counters. These address counters 37 and 38 are controlled by a count-up clock signal, a control signal for starting and ending the count, and an initial count signal. Clock signals applied to the address counters 37 and 38 are controlled by the clock signals CLK1 and CLK2 shown in FIGS. 6A(B) (or 6B(A)) and 6A(A) (or 6B(G)). As described before, the clock signal CLK1 enables the processing of 5000 picture element data within the duration of the scan synchronizing signal LSYNC. The clock signal CLK2 enables the processing of 7500 picture element data within the duration of the scan synchronizing signal LSYNC.

When the address counter 37 controls the write-in address of the T-RAM 57, a signal g shown in FIG. 6A(R) from the data selector 41 is applied to a clock input terminal of the address counter 37. The signal g in this case is substantially the clock signal CLK1. The preset initial counted value is "0" in this case because a fixed value FV3 supplied to the data selectors 35 and 36 is "0" and outputs "0" are used as preset values for the address counters 37 and 38 responsive to the signal a which is used as the selection signal. A signal e shown in FIG. 6A(P) is used as the control signal for starting and ending the count, and this signal e is substantially the signal D shown in FIG. 6A(D) (or 6B(E)) which is obtained by latching the input control signal INLGATE in the flip-flop 45. Accordingly, the 5000 picture element data from the CCD 7b are written into the T-RAM 57 from the address "0" to the address "4999".

When the T-RAM 57 carries out the write operation, the T-RAM 58 carries out the read operation and the address counter 38 controls the read-out address of the T-RAM 58. A signal j shown in FIG. 6A(W) from the data selector 42 is applied to a clock input terminal of the address counter 38. The signal j in this case is substantially the clock signal CLK2. The preset initial counted value is "2500" in this case because a fixed value FV9 supplied to the data selector 32 is "2500" and a high or low level selection signal 22 applied to the data selector 32 is switched by means of a jumper line or dip switch. The output of the data selector 32 is supplied to the data selectors 35 and 36, and the output "2500" is used as the preset value for the address counter 38 responsive to the signal b (inverted signal of the signal a) which is used as the selection signal. A signal h shown in FIG. 6A(T) from the data selector 42 is used as the control signal for starting and ending the count, and this signal h determines the output effective region of the 7500 picture element data within the duration of the scan synchronizing signal LSYNC. The signal h is substantially the signal E shown in FIG. 6A(F) (or 6B(J)) which is obtained by latching an output control signal OUTLGATE by the flip-flop 46 responsive to the clock signal CLK2. A signal COMP4 shown in FIG. 6A(0) from the comparator 40 becomes an output signal Q shown in FIG. 6A(S) of the data selector 41 at the counted value of (4999−X/2), and the flip-flop 50 outputs the signal XS and the counting operation is ended. The signal Q is applied to a clear terminal CLR of the flip-flop 50. The output signal COMP4 is applied to the data selector 41 together with an output signal COMP3 shown in FIG. 6A(N) of the comparator 39. The T-RAMs 57 and 58 repeat the operation above described.

The value (4999−X/2) is obtained as follows. First, the overlap quantity X is divided into X/2 in the ½ frequency divider 21 and is then inverted into −X/2 in the inverter 22. The value (4999−X/2) is obtained by adding a fixed value FV6 of "4999" and the value −X/2 in the adder 27. In other words, the value (4999−X/2) is supplied to the comparators 39 and 40 as a comparison value. When the address counter 37 controls the read-out address of the T-RAM 57 while the T-RAM 58 carries out the write operation, the signal COMP3 from the comparator 39 becomes the output Q of the data selector 41, and the flip-flop 50 outputs the signal X and the counting operation is ended.

The read operation is started from the address "2500" because the output data IDATAb of the CCD 7b located at the center between the CCDs 7a and 7c is divided at the central portion.

The address counters 30 and 31 connected to the T-RAMs 55 and 56 which carry out the write-in and read-out of the output data IDATAc of the CCD 7c are presettable up-counters. These address counters 30 and 31 are controlled by a count-up clock signal, a control signal for starting and ending the count, and an initial count signal. Clock signals applied to the address counters 30 and 31 are controlled by the clock signals CLK1 and CLK2 shown in FIGS. 6A(B) and 6A(A).

When the address counter 30 controls the write-in address of the T-RAM 55, the signal g shown in FIG. 6A(R) from the data selector 41 is applied to a clock input terminal of the address counter 30. The signal g in this case is substantially the clock signal CLK1. The preset initial counted value is "0" in this case because a fixed value FV1 supplied to the data selectors 25 and 26 is "0" and outputs "0" are used as preset values for the address counters 30 and 31 responsive to the signal a which is used as the selection signal. Another input value to the data selectors 25 and 26 is obtained by frequency dividing the overlap quantity X entered from the dip switch 20 into X/2 in the ½ frequency divider 21.

The signal f shown in FIG. 6A(P) from the data selector 41 is used as the control signal for starting and ending the count, and this signal f is substantially the signal D shown in FIG. 6A(D) which is obtained by latching the input control signal INLGATE in the flip-flop 45. Accordingly, the 5000 picture element data from the CCD 7c are written into the T-RAM 55 from the address "0" to the address "4999".

When the T-RAM 55 carries out the write operation, the T-RAM 56 carries out the read operation and the address counter 31 controls the read-out address of the T-RAM 56. The signal j shown in FIG. 6A(W) from the data selector 42 is applied to a clock input terminal of the address counter 31. The signal j in this case is substantially the clock signal CLK2. The preset initial counted value is the value (fixed value FV1 of "0") selected by the data selector 26, and the output value X/2 becomes the preset value of the address counter 31 the responsive to the selection signal b.

A signal i shown in FIGS. 6A(U) (or 6B(K)) from the data selector 42 is used as the control signal for starting and ending the count. When the counted value becomes (X+4835) by the output signal XS of the flip-flop 50, an output low-level signal COMP2 of the comparator 34 shown in FIG. 6A(M) is supplied to the flip-flop 50 through the data selector 42, and the counting operation is ended by the signal XS from the flip-flop 50. An output signal COMP1 of the comparator 33 shown in FIG. 6A(L) is also supplied to the data selector 42.

The adder 24 adds the overlap quantity X entered from the dip switch 20 and a fixed value FV5 of "4835", and outputs the value (X+4835) to the data selector 29. A fixed value FV8 supplied to the data selector 29 is set to "2499", and a selection signal Z1 applied to the data selector 29 is switched by a switching means such as a jumper line and dip switch so that the value (X+4835) is outputted from the data selector 29 and supplied to the comparators 33 and 34. The output signal XS of the flip-flop 50 is supplied to a selection signal input terminal of the data selector 61 by a switching means such as a jumper line and dip switch, and the output data is controlled by the data selector 61. The T-RAMs 55 and 56 repeat the operation above described.

Next, in the case where the circuit shown in FIGS. 5A through 5C is used as the circuit part 10a, the overlap quantity Y is entered from the dip switch 20. The input data IDATAb from the CCD 7b is latched by the 3-state buffers 51 and 52 shown in FIG. 5B while the input data IDATAa shown in FIG. 6B(B) from the CCD 7a is latched by the 3-state buffers 53 and 54, as indicated in brackets.

When the T-RAM 57 carries out the write operation, the T-RAM 58 carries out the read operation and address counter 38 controls the read-out address of the T-RAM 58. The signal j shown in FIG. 6A(W) from the data selector 42 is applied to the clock input terminal of the address counter 31. The signal j in this case is substantially the clock signal CLK2. The preset initial counted value is (141−Y). This value of (141−Y) is obtained by inverting the overlap quantity Y entered from the dip switch 20 into −Y, and adding a fixed value FV7 of "141" to the value −Y in the adder 28. The value (141−Y) from the adder 28 is supplied to the data selector 32.

In the case of the circuit part 10b, the selection signal Z2 is switched by the switching means such as the jumper line so as to output the value "2500" from the data selector 32. But in the case of the circuit part 10a, the selection signal Z2 is switched by the switching means so as to output the value (141−Y) from the data selector 32. Hence, in the case of the circuit part 10a, the preset value of the address counters 37 and 38 is (141−Y).

The signal h shown in FIG. 6A(T) from the data selector 42 is used as the control signal for starting and ending the count. The signal h is substantially the output signal E of the flip-flop 46 obtained by latching the signal OUTGATE by the clock signal CLK2. The signal COMP4 from the comparator 40 becomes the output signal Q of the data selector 41 when the counted value becomes (4999−Y/2), and the flip-flop 50 outputs the signal XS. The T-RAMs 57 and 58 repeat the operation above described.

The overlap quantity Y entered from the dip switch 20 is divided and inverted into −Y/2 through the ½ frequency divider 21 and the inverter 22, and the adder 27 adds the fixed value FV6 of "4999" to the value −Y/2 so as to output the value (4999−Y/2). This value (4999−Y/2) is supplied to the comparators 39 and 40 as the comparison value.

When carrying out the read operation, the signal COMP3 from the comparator 39 becomes the output signal Q of the data selector 41, and the flip-flop 50 outputs the signal XS.

In the case of the data IDATAb from the CCD 7b, the T-RAM 56 similarly carries out the read operation when the T-RAM 55 carries out the write operation. When the address counter 31 controls the read-out address of the T-RAM 56, the output signal j of the data selector 42 is applied to the clock input terminal of the address counter 31. The preset initial value is Y/2 because the ½ frequency divider 21 supplies to the data selector 26 the value Y/2 which is obtained by frequency-dividing the overlap quantity Y entered from the dip switch 20 by ½, and the value Y/2 is selectively outputted from the data selector 26 as the preset initial value responsive to the selection signal b.

The signal i from the data selector 42 is used as the control signal for starting and ending the count. When the counted value becomes "2499" in the address counter 31, the output signal COMP2 shown in FIG. 6A(M) of the comparator 34 becomes the output signal U shown in FIG. 6A(V) of the data selector 42, the flip-flop 50 outputs the signal XS and the counting operation is ended. The signal U is applied to a preset terminal PR of the flip-flop 50. The output signal COMP1 shown in FIG. 6A(L) of the comparator 33 is supplied to the data selector 42 together with the output signal COMP2 of the comparator 34. The T-RAMs 55 and 56 repeat the operation above described.

A jumper line or the like connects the output of the flip-flop 50 to the data selector 61 as indicated by m so that the output signal W shown in FIG. 6A(Y) of the flip-flop 50 becomes the selection signal for the data selector 61. The output data is outputted with the timing of the data IDATAb from the CCD 7b.

Therefore, according to the present embodiment, the output data ODATA1 of the circuit part 10b is made up of the output data IDATAb of the CCD 7b related to the picture element data from the picture element numbers 2500 to (4999−X/2) shown in FIG. 6B(H) and the output data IDATAc of the CCD 7c related to the picture element data from the picture element numbers X/2 to (4835+X) shown in FIG. 6B(I). On the other hand, the output data ODATA2 of the circuit part 10a is made up of the output data IDATAb of the CCD 7b related to the picture element data from the picture element numbers Y/2 to 2499 shown in FIG. 6B(O) and the output data IDATAa of the CCD 7a related to the picture element data from the picture element numbers (164−Y) to (4999−Y/2) shown in FIG. 6B(N). Thus, the data from each of the CCDs 7a, 7b and 7c are read out starting from the halfway position of the respective overlap quantities X and Y. As a result, the image data with deteriorated resolution obtained based on the image of the document imaged on the CCDs through the edge portion of the lens, and the image data obtained based on the image of the document imaged on the CCDs with reduced incident light quantity are not considered effective data. It is hence possible to obtain an image in which each portion corresponding to a connecting position of the output signals of the two mutually adjacent CCDs (image sensors) appear natural.

Next, a description will be given on a second embodiment of the image reading apparatus according to the present invention. The general block diagram of an essential part of the second embodiment is identical to that of the first embodiment described before in conjunction with FIG. 1. In addition, the positional relationship of three optical lenses and three CCDs of the second embodiment of the image reading apparatus is the same as those described before in conjunction with FIGS. 3 and 4. Furthermore, an essential part of the general block diagram of the second embodiment is identical to that shown in FIG. 4 described before. Therefore, the illustration of the general block diagram, the positional relationship of the three optical lenses and the three CCDs, and the block diagram of the essential part of the general block diagram will be omitted, and descriptions thereof will be given with reference to FIGS. 1 through 4.

According to the present embodiment, each of the CCDs 7a through 7c are simultaneously scanned and simultaneously output the picture element data. As may be seen from FIGS. 7(A) through 7(J) which will be described later, the scans of the CCDs 7a through 7c in the main scanning direction are synchronized by a scan synchronizing signal (LSYNC) shown in FIG. 7(B), and the effective data from the CCDs 7a through 7c are controlled by an input control signal LGATE shown in FIG. 7(A).

The inserting speed of the document in the sub scanning direction is determined by 16 pulses of the scan synchronizing signal LSYNC outputted per sub scan of 1 mm. Accordingly, the sub scanning density becomes 16 picture elements/mm and coincides with the main scanning density of 16 picture elements/mm. The pulses of the scan synchronizing signal LSYNC are outputted at constant intervals so as to keep the charging times of the CCDs 7a through 7c constant.

The image data from the CCDs are usually subjected to an analog processing in parallel within the duration of the scan synchronizing signal LSYNC. But as described before, because of the need to compensate for the overlap quantity between two mutually adjacent CCDs and to carry out a digital processing in a digital processing part (for example, to carry out a variable power process, a modulation transfer function (MTF) process, a smoothing process and the like) after the analog processing also within the duration of the scan synchronizing signal LSYNC, the output data of the CCDs are usually put together into one line data, and the overlap quantity is compensated. However, when the output data of the three CCDs 7a through 7c are put together into the one line data within the duration of the scan synchronizing signal LSYNC, the processing speed of the image data per picture element becomes three times that of the case where only a single CCD is used.

On the other hand, according to the present embodiment, when 5000 picture element data are processed per CCD within the duration of 3125 μsec of the scan synchronizing signal LSYNC, the processing time per picture element becomes 625 nsec. But when the output data of the three CCDs 7a through 7c are put together into one line data within the duration of 3125 μsec, the processing time per picture element becomes 208 nsec which is approximately three times faster than the processing time of 625 nsec. According to the present embodiment, the output data of the three CCDs 7a through 7c are not simply put together into the one line data. The processing of the picture element data is divided into two parts on the right and left of a center value of the maximum document width DW corresponding to the 2449th picture element of the CCD 7b in FIG. 2, so as to process 7500 picture element data within the duration of the scan synchronizing signal LSYNC. The processing of the picture element data is carried out to the right (or left) of the center value in the main scanning direction and to the left (or right) of the center value in a direction opposite to the main scanning direction, so as to reduce the processing time.

According to the present embodiment, the document is inserted into the image reading apparatus by taking a center position of the document along a direction perpendicular to the document inserting direction as a reference position, because no problems will be introduced when the image data read from the document is processed in two divisions about a center of the image data corresponding to the center position of the document. In addition, the processing direction of one of the circuit part 10a and 10b coincides with the main scanning direction while the processing direction of the other of the circuit parts 10a and 10b is opposite to the main scanning direction. Because the processing of the image data is divided into two parts and carried out in mutually opposite directions, it is possible to obtain an image in which each portion corresponding to a connecting position of the output signals of the two mutually adjacent CCDs appear natural for the following reasons.

Figure 8:
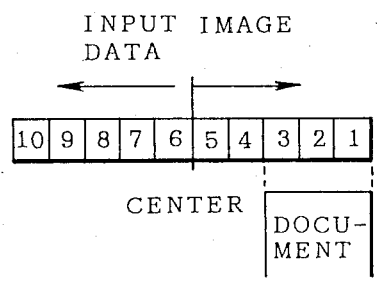
FIGS. 8A and 8B, FIGS. 9A and 9B and FIGS. 10A and 10B are diagrams for explaining various methods of processing the image data in divisions.
Figure 8:
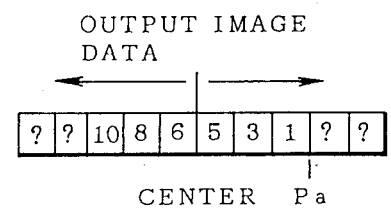

In the case shown in FIG. 8A, the document is inserted into the image reading apparatus by taking one edge of the document along the document inserting direction as the reference position, and the image data are processed in two divisions about the center of the image data by processing one-half of the image data in the main scanning direction from the center of the image data and processing the remaining one-half of the image data in a direction opposite to the main scanning direction from the center of the image data. But in this case, it is necessary to calculate a position Pa in FIG. 8B which corresponds to the reference position of the document when the image data processed in the divisions are subjected to a thin-out process or the like.

Figure 9:
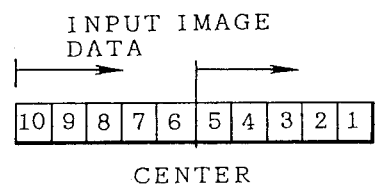
Figure 9:
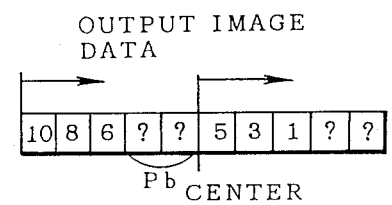

In the case shown in FIG. 9A, the document is inserted into the image reading apparatus by taking the center position of the document along the direction perpendicular to the document inserting direction as the reference position, and the image data are processed in two divisions about the center of the image data by processing one-half of the image data in the main scanning direction from one end of the image data and processing the remaining one-half of the image data in the main scanning direction from the center of the image data. However, the image data does not connect at a position Pb shown in FIG. 9B when the image data processed in the divisions are subjected to the thin-out process or the like.

Figure 10:
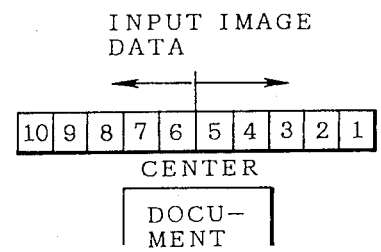
Figure 10:
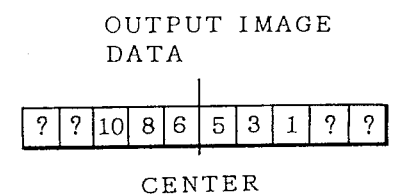

On the other hand, in the present embodiment, the document is inserted into the image reading apparatus by taking the center position of the document along the direction perpendicular to the document inserting direction as the reference position as shown in FIG. 10A, and the image data are processed in two divisions about the center of the image data by processing one-half of the image data in the main scanning direction from the center of the image data and processing the remaining one-half of the image data in the direction opposite to the main scanning direction from the center of the image data. As shown in FIG. 10B, the image data connect naturally at the center position even when the image data processed in the division are subjected to the thin-out process or the like.

In FIGS. 8A through 10B, the numbers indicate the picture element numbers, and it is assumed for convenience' sake that the picture element data with the numbers "2", "4", "7" and "9" are thinned out by the thin-out process. As may be seen from FIGS. 8A through 10B, it is possible to reduce the processing time and also prevent unnatural connection of the image data after the processing such as the thin-out process, by processing the image data in two divisions about the center of the image data and processing one-half of the image data in the main scanning direction from the center of the image data while processing the remaining one-half of the image data in the direction opposite to the main scanning direction from the center of the image data.

Figure 11:
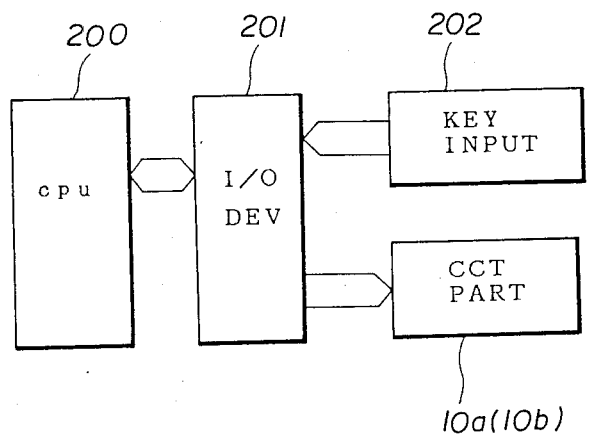
FIG. 11 is a system block diagram showing an embodiment of a system for entering information on the overlap quantity into a circuit part of the second embodiment.

FIG. 11 shows an embodiment of a system for entering information on the overlap quantities X and Y into the circuit parts 10a and 10b. The overlap quantities X and Y entered from a key input part 202 are supplied to a central processing unit (CPU 200 through an input-/output device 201 and converted into commands of the overlap quantities X and Y. The commands from the CPU 200 are respectively supplied in parallel to the circuit parts 10b and 10a through the input/output device 201.

Figure 7:
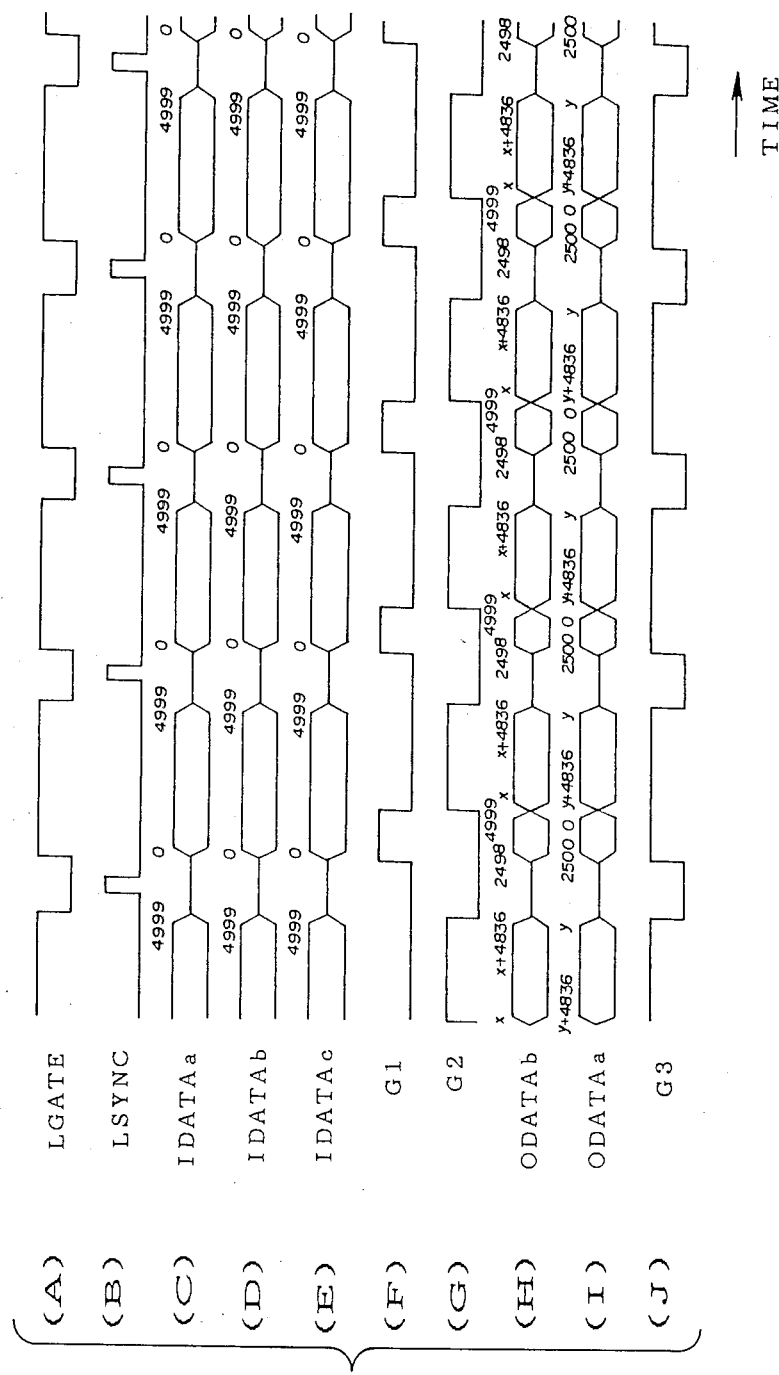
FIGS. 7(A) through 7(J) are timing charts for explaining the operation of a second embodiment of the image reading apparatus according to the present invention.

An output data ODATAb shown in FIG. 7(H) from the circuit part 10b is made up of the picture element data numbers "2498" to "4999" out of the input image data IDATAb from the CCD 7b and the picture element data numbers X to (X+4836) out of the input image data IDATAc from the CCD 7c. The input image data IDATAb and IDATAc are shown in FIGS. 7(D) and 7(E), respectively. The output timing of the output data ODATAb is determined by gate signals G1 and G2 respectively shown in FIGS. 7(F) and 7(G).

An output data ODATAa shown in FIG. 7(I) from the circuit part 10a is made up of the picture element data numbers "2500" to "0" out of the input image data IDATAb from the CCD 7b and the picture element data numbers (Y+4836) to Y out of the input image data IDATAa from the CCD 7a. The input image data INDATAa is shown in FIG. 7(C). The output timing of the output data ODATAa is also determined by the gate signals G1 and G2 respectively shown in FIGS. 7(F) and 7(G). The effective portions of the output data ODATAa and ODATAb can be outputted by use of a gate signal G3 shown in FIG. 7(J).

With regard to the CCD 7b located at the center between the CCDs 7a and 7c, the effective picture element data are 5000. The overlap quantities X and Y are within 164 picture element data. The divided image data at the center position of the CCD 7b overlap because the data is required for the image processing carried out in a subsequent stage. In other words, the overlap quantities X and Y need to be converted into hexadecimal values by carrying out an operation.

Figure 12:
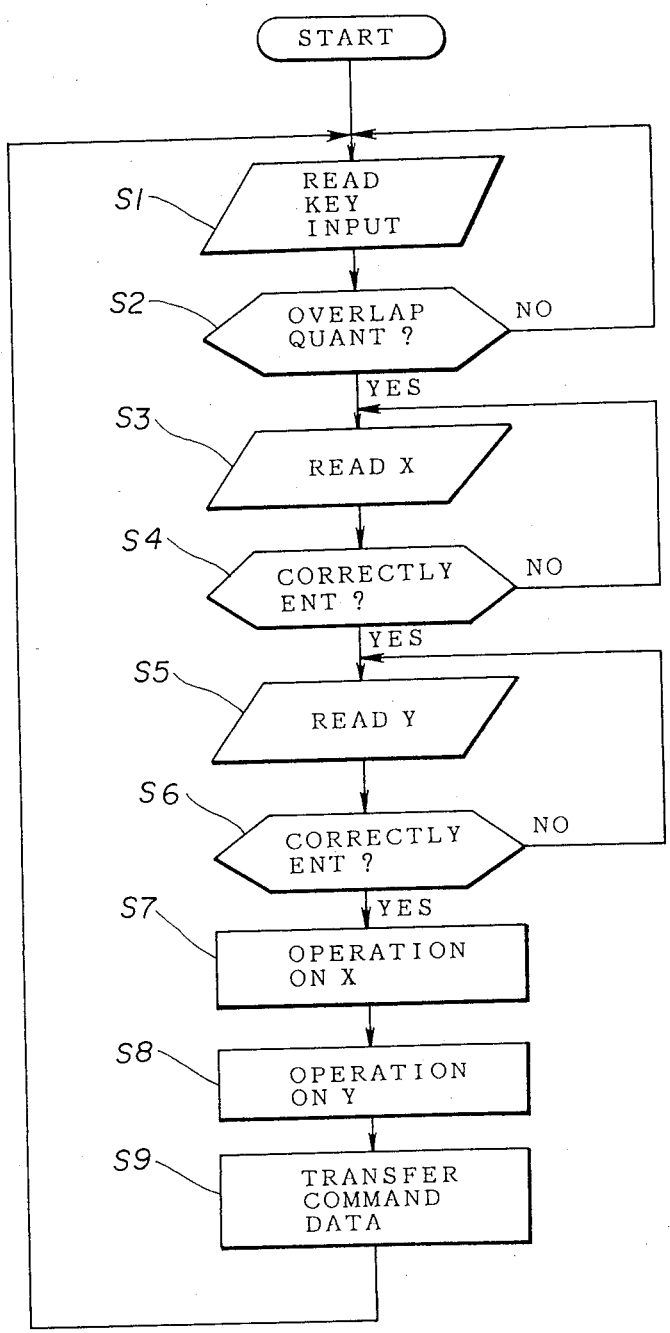
FIG. 12 is a flow chart for explaining the operation of a CPU in the system shown in FIG. 11.

Next, a description will be given on the operation of the block system shown in FIG. 11 by referring to a flow chart of FIG. 12 which shows the operation of the CPU 200. When there is a request to enter the overlap quantity from the key input part 202 such as a ten-key of a manipulation part, the CPU 200 is in a waiting state ready to read the overlap quantity entered from the key input part 202. In other words, a step S1 reads the input from the key input part 202, and a step S2 discriminates whether or not the overlap quantity is entered. When the discrimination result in the step S2 becomes YES, a step S3 reads the overlap quantity X, and a step S4 discriminates whether or not the overlap quantity X is correctly entered. When the discrimination result in the step S4 is YES, a step S5 reads the overlap quantity Y, and a step S6 discriminates whether or not the overlap quantity Y is correctly entered. When the discrimination result in the step S6 is YES, a step S7 converts the overlap quantity X into a corresponding hexadecimal value by carrying out an operation so as to obtain a command data of the overlap quantity X. A step S8 converts the overlap quantity Y into a corresponding hexadecimal value by carrying out an operation so as to obtain a command data of the overlap quantity Y. Then, a step S9 transfers the command data of the overlap quantities X and Y in parallel to the respective circuit parts 10b and 10a through the input/output device 201.

Figure 13:
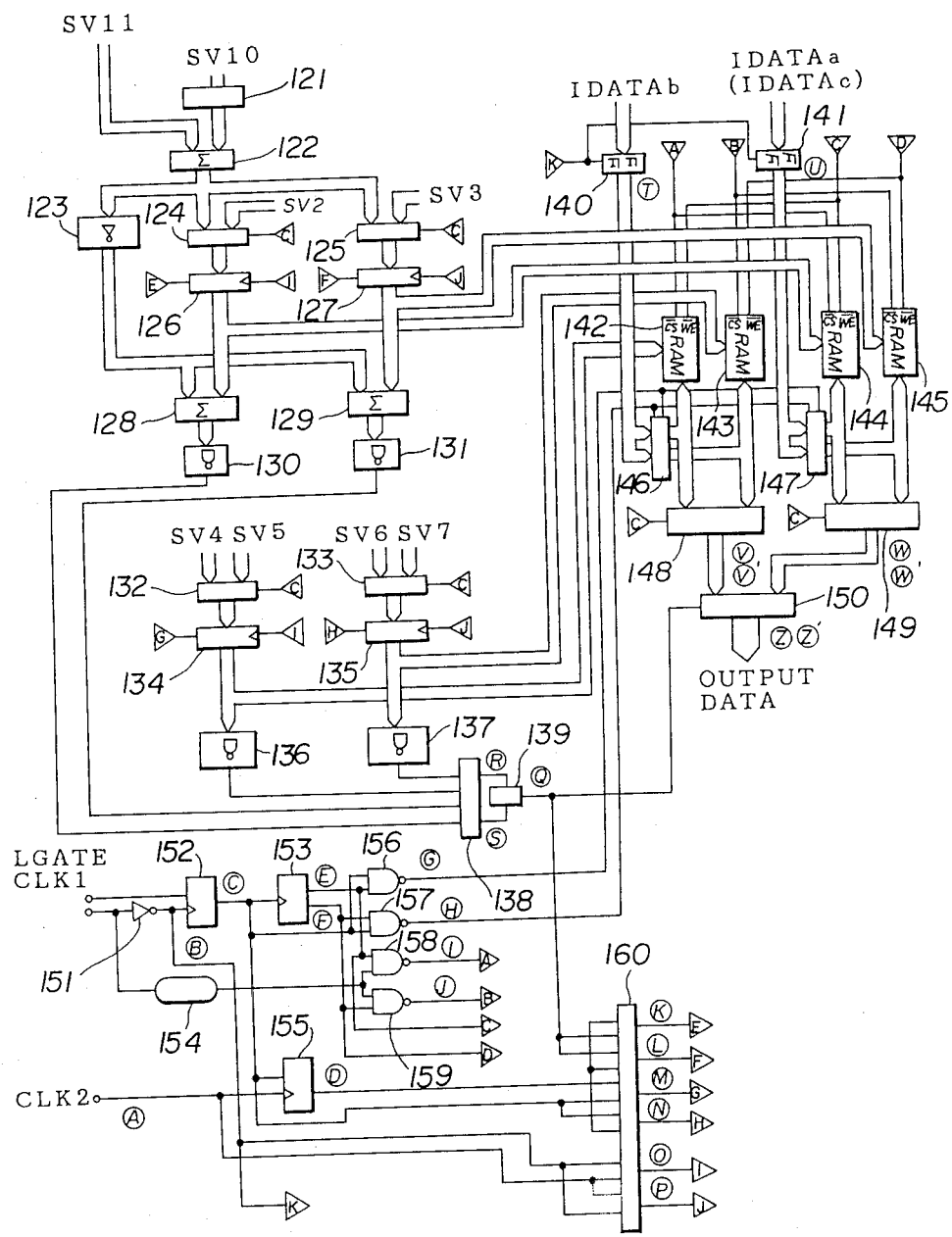
FIG. 13 is a system block diagram showing an embodiment of a circuit part of the second embodiment.

FIG. 13 shows another embodiment of the circuit parts 10a and 10b shown in FIG. 4 applicable to the second embodiment. The circuit part shown in FIG. 13 comprises a flip-flop 121, an adder 122, and inverter 123, data selectors 124 and 125, address counters 126 and 127, adders 128 and 129, NAND gates 130 and 131, data selectors 132 and 133, address counters 134 and 135, NAND gates 136 and 137, a data selector 139, flip-flops 139, 140 and 141, toggle random access memories (T-RAMs) 142 through 145, 3-state buffers 146 and 147, data selectors 148 through 150, an inverter 151, flip-flops 152, 153 and 155, a delay element 154, NAND gates 156 through 159, and a data selector 160.

Figure 14:
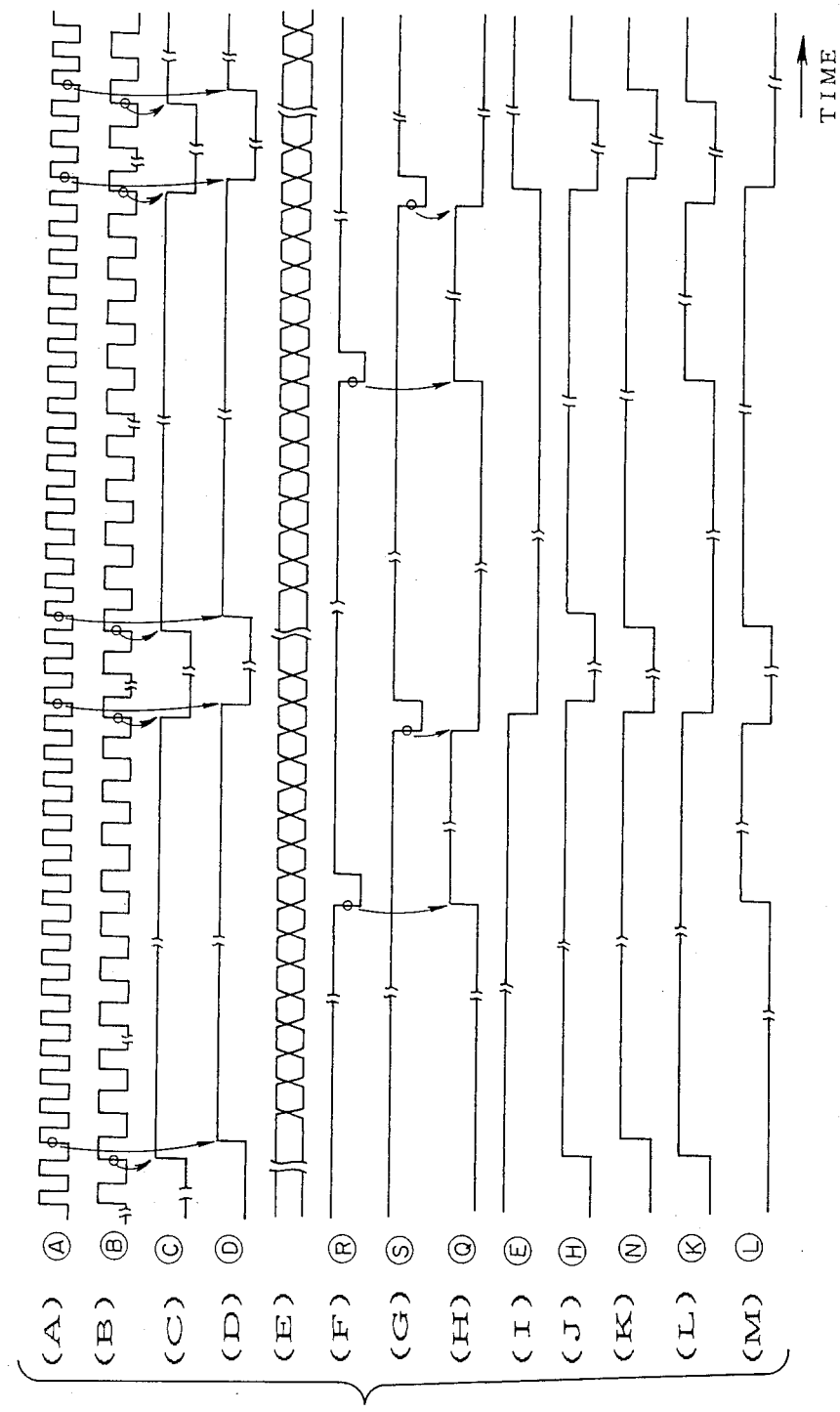
FIGS. 14(A) through 14(M) and FIGS. 15(A) through 15(N) are timing charts for explaining the operation of the circuit part shown in FIG. 13.
Figure 15:
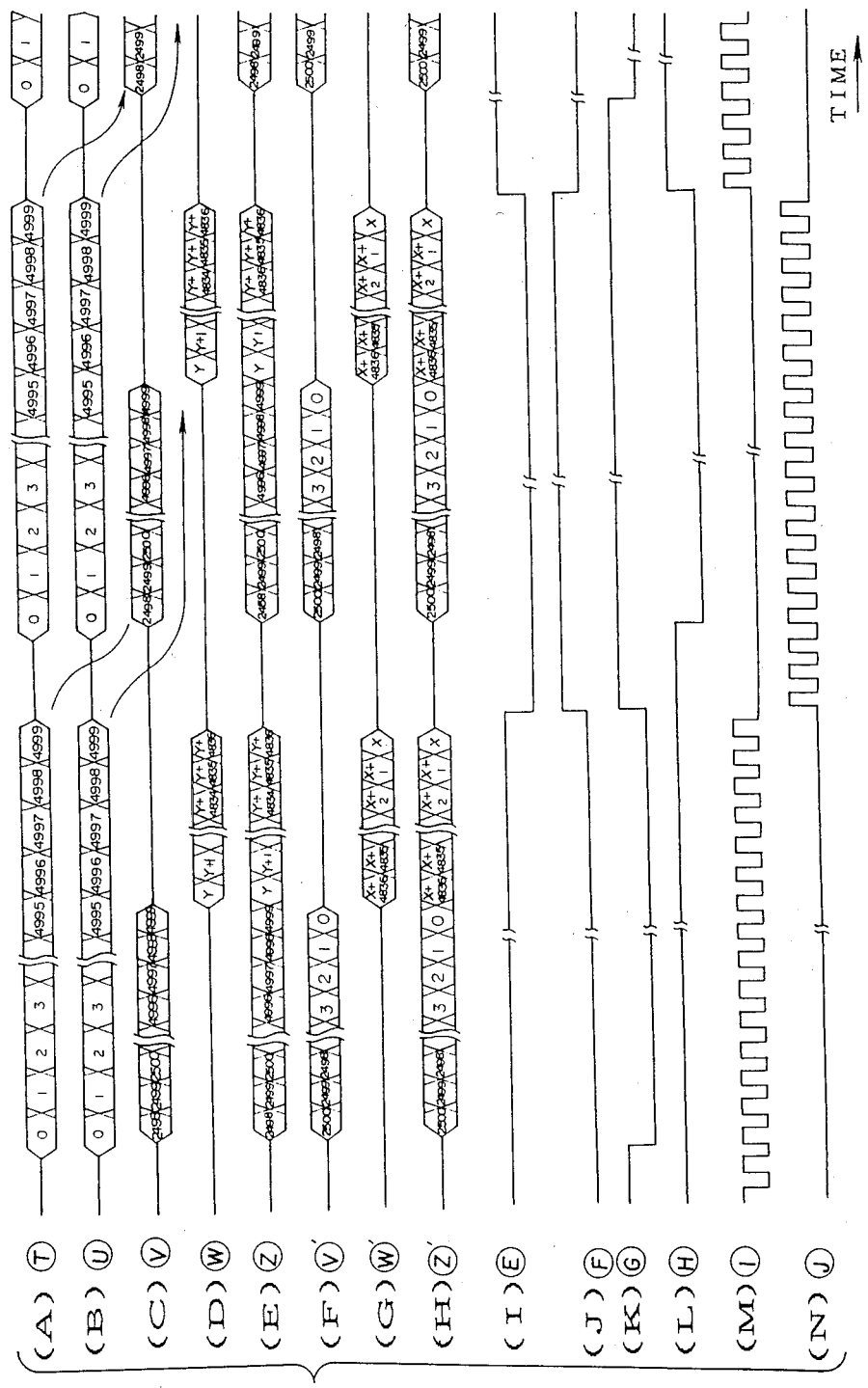

Next, a description will be given on the circuit part shown in FIG. 13 by referring to FIGS. 14(A) through 14(M0 and FIGS. 15(A) through 15(N).

A set data SD10 corresponds to the command of the overlap quantity Y when the circuit part shown in FIG. 13 is used as the circuit part 10b and corresponds to the command of the overlap quantity Y when the circuit part shown in FIG. 13 is used as the circuit part 10a. The set data SD10 is latched by the flip-flop 121 in synchronism with the scan synchronizing signal LSYNC shown in FIG. 7(B) and the input control signal LGATE shown in FIG. 7(A). The output data of the flip-flop 121 is supplied to the adder 122 together with a set data SD11 which is fixed. The set data SD11 is "0" when the circuit part is used as the circuit part 10a and is "4836" when used as the circuit part 10b.

In the case where the circuit shown in FIG. 13 is used as the circuit part 10a, the input data IDATAb from the CCD 7b and the input data IDATAa from the CCD 7a are latched by the flip-flops 140 and 141, respectively. The output of the flip-flop 140 is supplied to the 3-state buffer 146 and is supplied to either the T-RAM 142 or 143. The output of the flip-flop 141 is supplied to the 3-state buffer 147 and is supplied to either the T-RAM 144 or 145. Selection signals G and H shown in FIGS. 15(K) and 15(L) from the respective NAND gates 156 and 157 are supplied to the 3-state buffers 146 and 147 as selection signals. The 3-state buffer 146 outputs the incoming data to one of the T-RAMs 142 and 143 when a corresponding one of the selection signals G and H has a low level. Similarly, the 3-state buffer 147 outputs the incoming data to one of the T-RAMs 144 and 145 when a corresponding one of the selection signals G and H has a low level.

The write-in and read-out to and from the T-RAMs 142 through 145 are controlled by signals supplied to chip select terminals $\overline{CS}$ and write enable terminals $\overline{WE}$ thereof. A signal I shown in FIG. 15(M) from the NAND gate 158 are supplied to the chip select terminals $\overline{CS}$ of the T-RAMs 142 and 144 and a signal J shown in FIG. 15(N) are supplied to the chip select terminals $\overline{CS}$ of the T-RAMs 143 and 145 to control the write-in timings thereof. These signals supplied to the chip select terminals $\overline{CS}$ of the T-RAMs 142 through 145, a signal E shown in FIG. 15(I) (or 14(I)) supplied to the write enable terminals $\overline{WE}$ of the T-RAMs 142 and 144 and a signal F shown in FIG. 15(J) supplied to the write enable terminals $\overline{WE}$ of the T-RAMs 143 and 145 control the read-out timings thereof.

The signals E and F are toggle mode signals outputted from the flip-flop 153 which receives a signal C shown in FIG. 14(C) to a clock input terminal thereof. The signal C is outputted from the flip-flop 152 which receives the input control signal LGATE shown in FIG. 7(A) and a signal B from the inverter 151 shown in FIG. 14(B) which is an inverted signal of the clock signal CLK1. The signal I is obtained by taking a NAND of the signal E and a delayed signal of the clock signal CLK1 from the delay element 154. The signal J is obtained by taking a NAND of the signal F and the delayed signal of the clock signal CLK1 from the delay element 154.

Outputs of the address counters 134, 135, 126 and 127 are respectively connected to address count terminals of the T-RAMs 142 through 145. One of the T-RAMs 142 and 143 carries out a write operation when the other carries out a read operation, and the present input data IDATAb is written into on the the T-RAMs 142 and 143 while the other reads out the previously written data. Similarly, one of the T-RAMs 144 and 145 carries out a write operation when the other carries out a read operation. The data selectors 148 and 149 selectively output the read out data from the T-RAMs 142 through 145. The signal E from the flip-flop 153 is supplied to the data selectors 148 and 149 as a selection signal.

The address counters 134 and 135 which determine the address of the T-RAMs 142 and 143 which write and read the input data IDATAb are presettable up-counters. These address counters 134 and 135 are controlled by a count-up clock signal, a control signal for starting and ending a count, and a initial count signal. Clock signals applied to the address counters 134 and 135 are controlled by the signal B (inverted signal of the clock signal CLK1) and a clock signal A (CLK2) shown in FIG. 14(A). As described before, the signal B enables the processing of 5000 picture element data within the duration of the scan synchronizing signal LSYNC. The clock signal A (CLK2) enables the processing of 7500 picture element data within the duration of the scan synchronizing signal LSYNC.

When the address counter 134 controls the write-in address of the T-RAM 142, a signal O from the data selector 160 is applied to a clock input terminal of the address counter 134. The signal O in this case is substantially the clock signal B. The preset initial counted value "0" in this case because a set value SV4 supplied to the data selector 132 is "0" and an output "0" is used as the preset value for the address counter 134 responsive to the signal E which is used as the selection signal. A set value SV5 is "2498". A signal M from the data selector 160 is used as the control signal for starting and ending the count, and this signal M is substantially the signal C which is obtained by latching the input control signal LGATE in the flip-flop 152. Accordingly, the 5000 picture element data T from the CCD 7b are written into the T-RAM 142 from the address "0" to the address "4999" as shown in FIG. 15(A).

When the T-RAM 142 carries out the write operation, The T-RAM 143 carries out the read operation and the address counter 135 controls the read-out address of the T-RAM 143. A signal P from the data selector 160 is applied to a clock input terminal of the address counter 135. The signal P in this case is substantially the clock signal A. The preset initial counted value is "2500" in this case because a set value SV7 supplied to the data selector 133 is "2500" and the selection signal E is applied to the data selector 133. A set value SV6 supplied to the data selector 133 is "0". The output of the data selector 133 is supplied to the address counter 135, and the output "2500" is used as the preset value for the address counter 135 responsive to the signal E which is used as the selection signal. A signal N shown in FIG. 14(K) from the data selector 160 is used as the control signal for starting and ending the count, and this signal N is substantially a signal D shown in FIG. 14(D) which is obtained by latching the signal C by the flip-flop 155 responsive to the clock signal A. A signal from the NAND gate 137 becomes an output signal R of the data selector 138 shown in FIG. 14(F) when the counted value becomes "5000" in the address counter 135. The signal R is applied as a set signal to the flip-flop 139, and a signal Q shown in FIG. 14(H) is outputted from the flip-flop 139. The T-RAMs 142 and 143 repeat the operation above described.

When the address counter 134 determines the read-out address of the T-RAM 142, the signal from the NAND gate 136 becomes the output signal R of the data selector 138. The signal R is applied as a set signal to the flip-flop 139, and the signal Q is outputted from the flip-flop 139.

In addition, the read-out address is started from "2500" by dividing the input data IDATAb from the CCD 7b at the center position, and the circuit part 10a carries out an up-count operation since the processing direction coincides with the main scanning direction.

The address counters 126 and 127 which determine the address of the T-RAMs 144 and 145 which carry out the write-in and read-out of the input data IDATAa from the CCD 7a are presettable up-counters. These address counters 126 and 127 are controlled by a count-up clock signal, a control signal for controlling the start and end of the count, and an initial count signal. Clock signals O and P supplied to the address counters 126 and 127 are controlled by the signals B and A, that is, the inverted signal of the clock signal CLK1 and the clock signal CLK2.

When the address counter 126 controls the write-in address of the T-RAM 144, the signal O from the data selector 160 is supplied to a clock input terminal of the address counter 126. The signal O is substantially the signal B in this case. A preset initial counted value of the address counter 126 is "0" because a set value SV2 supplied to the data selector 124 is "0" and the "0" output of the data selector 124 becomes the preset value of the address counter 126 responsive to the signal E. The other value supplied to the data selector 124 corresponds to the overlap quantity Y which is adjusted. A signal K shown in FIG. 14(L) from the data selector 160 is used as the control signal for starting and ending the count. The signal K is substantially the signal C in this case. Accordingly, the 5000 picture element data U from the CCD 7a are written into the T-RAM 142 from the address "0" to the address "4999" as shown in FIG. 15(B).

The T-RAM 145 carries out a read operation while the T-RAM 144 carries out a write operation. When the address counter 127 controls the read out address of the T-Ram 145, the signal P from the data selector 160 is supplied to the address counter 127 as a clock signal. The signal P is substantially the clock signal A in this case. The overlap quantity Y is entered from the key input part 202 shown in FIG. 11 and is converted into the hexadecimal value by the operation carried out in the CPU 200 so as to obtain the command of the overlap quantity Y. The adder 122 adds this command of the overlap quantity Y and a set value SV11 which is "0", and the added value is supplied to the data selector 125. A set value SV3 which is "0" is supplied as the other value to the data selector 125. The added value from the adder 122 which is the command of the overlap quantity Y in this case is selectively outputted from the data selector 125 and becomes the preset value of the address counter 127 responsive to the signal E.

A signal L shown in FIG. 14(M) from the data selector 160 is used as the control signal for starting and ending the count. When the counted value becomes (Y+4836) in the address counter 127 at the start of the count, the signal from the NAND gate 131 becomes an output signal S of the data selector 138 shown in FIG. 14(G). The signal S is applied as a reset signal to the flip-flop 139, and the signal Q is outputted from the flip-flop 139. The signal Q is used to select the output data of the data selector 150. In this case, data V and W shown in FIGS. 15(C) and 15(D) are supplied to the data selector 150 from the respective data selectors 148 and 149, and a data Z shown in FIG. 15(E) is outputted from the data selector 150. The T-RAMs 144 and 145 repeat the operation above described.

The adjustment of the overlap quantity Y between the input data IDATAa and IDATAb from the CCDs 7a and 7b is adjusted by simply adjusting only the input data IDATAa. This adjustment can be made from an external measuring device such as an oscilloscope or from an image printed by a printer which is connected to the image reading apparatus.

The number of effective picture element data out of the input data IDATAa from the CCD 7a is set to 4836. Hence, by taking a sum of an inverted sum of the command of the overlap quantity Y (that is, the output of the adder 122) and the set value SV11 ("0") and the counted value ((command of Y) +4836−Y=4836), the counted value "4836" is determined as the output data of the adder 128. The read-out count of the input data IDATAa is determined by taking a NAND of the output data of the adder 128, and the read-out count is used as a reset value of the flip-flop 139.

Next, a description will be given for the case where the circuit part shown in FIG. 13 is used as the circuit part 10b. In this case, the write operation of the T-RAMs 142 through 145 is the same as that of the case where the circuit part is used as the circuit part 10a, and a description thereof will be omitted. Accordingly, a description will be given on the read operation of the T-RAMs 142 through 145.

The T-RAM 143 carries out a read operation while the T-RAM 142 carries out a write operation. When the address counter 135 controls the read-out address of the T-RAM 143, the signal P from the data selector 160 is supplied to the address counter 135 as the clock signal. The signal P is substantially the clock signal A in this case. The preset initial counted value is "2500" in this case because the data selector 133 is supplied with a set value SV7 of "2500" and a set value SV6 of "0" and the set value SV7 becomes the preset value of the address counter 135 responsive to the selection signal E. The signal N is used as the control signal for starting and ending the count. The signal N is substantially the signal D in this case. Because the address counter 135 is an up/down counter, a down-count operation is carried out during the read-out responsive to the signal E. In this state, the signal from the NAND gate 137 becomes the output signal R of the data selector 138. The signal R is applied as a set signal to the flip-flop 139, and the signal Q is outputted from the flip-flop 139. In this case, the T-RAMs 142 and 143 carry out a toggle operation.

In addition, the read-out address is started from "2500" by dividing the input data IDATAb from the CCD 7b at the center position, and the circuit part 10b carries out a down-count operation since the processing direction is opposite to the main scanning direction.

When the T-RAM 144 carries out the write operation, the T-RAM 145 carries out a read operation. When the address counter 127 controls the read-out address of the T-RAM 145, the signal P from the data selector 160 is supplied to the address counter 127 as a clock signal. The signal P is substantially the clock signal A in this case. The overlap quantity X is entered from the key input part 202 shown in FIG. 11 and is converted into the hexadecimal value by th operation carried out in the CPU 200 so as to obtain the command of the overlap quantity X. The adder 122 adds this command of the overlap quantity X and a set value SV11 which is "4836", and the added value is supplied to the data selector 125. A set value SV3 which is "0" is supplied as the other value to the data selector 125. The added value from the adder 122 which is a sum of the command of the overlap quantity X and "4836" in this case is selectively outputted from the data selector 125 and becomes the preset value of the address counter 127 responsive to the signal E.

The signal L from the data selector 160 is used as the control signal for starting and ending the count. When the counted value becomes the command of the overlap quantity X in the address counter 127 at the start of the count, the signal from the NAND gate 131 becomes the output signal S of the data selector 138. The signal S is applied as a reset signal to the flip-flop 139, and the signal Q is outputted from the flip-flop 139. The signal Q is used to control the data selector 150 so as to selectively output the command of the overlap quantity X. In this case, data V' and W' shown in FIGS. 15(F) and 15(G) are supplied to the data selector 150 from the respective data selectors 148 and 149, and a data Z' shown in FIG. 15(H) is outputted from the data selector 150. In addition, since the address counter 127 is an up/down counter, a down-count operation is carried out responsive to the signal E during the read operation. In this case, the T-RAMs 144 and 145 carry out a toggle operation.

According to the present embodiment, the set value SV11 is set to "0" when the circuit part is used as the circuit part 10a and is set to "4836" when the circuit part is used as the circuit part 10b. However, it is possible to make a corresponding entry from the key input part 202.

The adjustment of the overlap quantity X between the input data IDATAb and IDATAc from the CCDs 7b and 7c is adjusted by simply adjusting only the input data IDATAa. This adjustment can be made from an external measuring device such as an oscilloscope or from an image printed by a printer which is connected to the image reading apparatus.

The number of effective picture element data out of the input data IDATAc from the CCD 7c is set to 4836. Hence, by taking a sum of an inverted sum of the command of the overlap quantity X (that is, the output of the adder 122) and the set value SV11 ("4836") and the counted value ((command of X)+4836−4836=X), the counted value "4836" is determined as the output data of the adder 128. The read-out count of the input data IDATAc is determined by taking a NAND of the output data of the adder 128, and the read-out count is used as a reset value of the flip-flop 139.

According to the present embodiment, based on a maximum number of effective picture elements, each overlap quantity of image information outputted from two mutually adjacent image sensors is put together into one line data as an offset value. The offset value can be used to correct the output of one of the two mutually adjacent image sensors while making no correction of the output of the other when putting together one line data so as to compensate for the overlap of image information outputted from the two mutually adjacent image sensors. In addition, by processing the one line data in two divisions about the center of the image data corresponding to the center of the document along the direction perpendicular to the document inserting direction, there is no unnatural connection at the position where the image data connect regardless of the kind of processing which is carried out, and the processing time can be reduced. It is also possible to facilitate the entering of the overlap quantity, thereby improving the operating characteristics of the image reading apparatus.

Further, the present invention is not limited to these embodiments, but various variations and modifications may be made without departing from the scope of the present invention.

What is claimed is:

1. An image reading apparatus for optically reading an image of a document, said image reading apparatus comprising:
   an illumination device for illuminating the document;
   a plurality of optical lenses;
   a plurality of image sensors on which the image of the document illuminated by said illumination device is imaged through said optical lenses, said image sensors outputting analog image signals describing the image of the document, said analog image signals including overlapping image information which overlap by an overlap quantity between two mutually adjacent image sensors out of said image sensors;

converting means for converting the analog image signals from said image sensors into digital image signals describing picture elements constituting the image; and circuit means supplied with the digital image signals from said converting means for connecting the digital image signals to form each line data of the image, said circuit means comprising memory means for storing the digital image signals from said converting means and the overlap quantity and control means for controlling write and read operations of said memory means, said control means controlling the read operation of said memory means so that in each line data digital image signals derived from the output analog image signals of the two mutually adjacent image sensors connect at a position corresponding to one-half the overlap quantity.

2. An image reading apparatus as claimed in claim 1 which further comprises input means for entering the overlap quantities X and Y for being stored in said memory means.

3. An image reading apparatus as claimed in claim 1 in which said plurality of image sensors are of an even number, a stored digital image signal in said memory means derived from an output analog image signal of a first of the two mutually adjacent image sensors is first read out starting from a picture element number "L−X" to "M−X/2" and a stored digital image signal in said memory means derived from an output analog image signal of a second of the two mutually adjacent image sensors is then read out starting from a picture element number "X/2" to "M" when reading one line data of the image, where L denotes a maximum overlap quantity between the first of the two mutually adjacent image sensors and an adjacent image sensor other than the second of the two mutually adjacent image sensors, M denotes a maximum effective picture element number which can be read per image sensor and X denotes the overlap quantity between said two mutually adjacent image sensors.

4. An image reading apparatus as claimed in claim 3 which further comprises input means for entering the overlap quantity X for being stored in said memory means.

5. An image reading apparatus as claimed in claim 1 in which said plurality of image sensors are of an odd number, a stored digital image signal derived from an output analog image signal of a first image sensor is first read out starting from a picture element number "L−Y" to "M−Y/2", a stored digital image signal derived from an output analog image signal of a second image sensors is then read out starting from a picture element number "Y/2" to "M/2−1", the stored digital image signal of the second image sensor is then read out starting from a picture element number "M/2" to "M−X/2" and a stored digital image signal of a third image sensor is then read out starting from a picture element number "X/2" to "X+M−L" when reading one line data of the image, where the first and second image sensors are mutually adjacent and the second and third image sensors are mutually adjacent, L denotes a maximum overlap quantity between the first image sensor and an adjacent image sensor other than the second image sensor and an overlap quantity between the third image sensor and an adjacent image sensor other than the second image sensor, M denotes a maximum effective picture element number which can be read per image sensor, Y denotes the overlap quantity between the first and second image sensors, and X denotes the overlap quantity between the second and third image sensors.

6. An image reading apparatus as claimed in claim 5 which further comprises input means for entering the overlap quantities X and Y for being stored in said memory means.

7. An image reading apparatus as claimed in claim 1 in which the document is inserted into said image reading apparatus in a document inserting direction by taking a center position of the document along a direction perpendicular to the document inserting direction as a reference position which coincides with a center of the image sensors which are arranged in the direction perpendicular to the document inserting direction, and said circuit means processes each one line data of the digital image signals in two divisions about a center of the one line data constituted by image data by processing one-half of the image data in a main scanning direction from the center of the one line data and processing a remaining one-half of the image data in a direction opposite to the main scanning direction from the center of the one line data, said main scanning direction being a direction in which said image sensors scan the image of the document.

8. An image reading apparatus as claimed in claim 7 in which said control means controls the write and read operations of said memory means so that one-half of the image data constituting one line data are written into and read out from said memory means in mutually opposite sequences respectively corresponding to the main scanning direction and the direction opposite to the main scanning direction.

9. An image reading apparatus as claimed in claim 7 which further comprises input means for entering the overlap quantity for being stored in said memory means.

10. An image reading apparatus as claimed in claim 9 in which said input means comprises a key input part for entering the overlap quantity, and processing means for processing the overlap quantity entered from said key input means into a command data of the overlap quantity for being supplied to said circuit means.

11. An image reading apparatus for optically reading an image of a document, said image reading apparatus comprising:

an illumination device for illuminating the document;

a plurality of optical lenses;

a plurality of image sensors on which the image of the document illuminated by said illumination device is imaged through said optical lenses, said image sensors outputting analog image signals describing the image of the document, said analog image signals including overlapping image information which overlap by an overlap quantity between two mutually adjacent image sensors out of said image sensors;

converting means for converting the analog image signals from said image sensors into digital image signals describing picture elements constituting the image;

image means for entering overlap quantities; and circuit means supplied with the digital image signals from said converting means for connecting the digital image signals to form each line data of the image, said circuit means comprising memory means for storing the digital image signals from said converting means, control means for controlling write and read operations of said memory means, address counter means for count an address of said memory means, processing means for processing the overlap quantities from said input means into command data by carrying out an operation, and selecting means for selecting an overlap quantity during the read operation of said memory means, said selecting means selecting the overlap quantity from the overlap quantities entered from said input means so that an address in said address counter from which the read operation of said memory means starts matches the command data from said processing means which possesses the overlap quantity selected by said selecting means.

12. An image reading apparatus as claimed in claim 11 in which the document is inserted into said image reading apparatus in a document inserting direction by taking a center position of the document along a direction perpendicular to the document inserting direction as a reference position which coincides with a center of the image sensors which are arranged in the direction perpendicular to the document inserting direction, and said circuit means possesses each one line data of the digital image signals in two divisions about a center of the one line data constituted by image data by processing one-half of the image data in a main scanning direction from the center of the one line data and processing a remaining one-half of the image data in a direction opposite to the main scanning direction from the center of the one line data, said main scanning direction being a direction in which said image sensors scan the image of the document.

13. A image reading apparatus as claimed in claim 12 in which said control means controls the write and read operations of said memory means so that one-half of the image data constituting one line data are written into and read out from said memory means in mutually opposite sequences respectively corresponding to the main scanning direction and the direction opposite to the main scanning direction.

* * * * *